(12) United States Patent
Hu (10) Patent No.: US 12,209,428 B2
(45) Date of Patent: Jan. 28, 2025

(54) FENCING PANEL

(71) Applicant: Hebei Minmetals Co., Ltd., Shijiazhuang (CN)

(72) Inventor: Kebiao Hu, Shijiazhuang (CN)

(73) Assignee: Hebei Minmetals Co., Ltd., Hebei (CN)

( * ) Notice: Subject to any disclaimer, the term of this patent is extended or adjusted under 35 U.S.C. 154(b) by 0 days.

(21) Appl. No.: 17/500,040

(22) Filed: Oct. 13, 2021

(65) Prior Publication Data
US 2022/0349209 A1    Nov. 3, 2022

Related U.S. Application Data

(60) Provisional application No. 63/181,570, filed on Apr. 29, 2021.

(51) Int. Cl.
| | | |
|---|---|---|
| *E04H 17/16* | (2006.01) | |
| *B21F 29/00* | (2006.01) | |
| *E04H 17/18* | (2006.01) | |

(52) U.S. Cl.
CPC ........... *E04H 17/163* (2013.01); *B21F 29/00* (2013.01); *E04H 17/185* (2021.01)

(58) Field of Classification Search
CPC ..... E04H 17/163; E04H 17/185; E04H 17/02; E04H 17/10; E04H 17/161; B29F 29/00; B29F 29/02; B23K 1/00; B23K 1/0004; E06B 11/021

See application file for complete search history.

(56) References Cited

U.S. PATENT DOCUMENTS

| | | | | |
|---|---|---|---|---|
| 2,260,176 | A * | 10/1941 | Ford | E04H 17/163 |
| | | | | 160/371 |
| 3,839,834 | A * | 10/1974 | Goddard | E04B 2/74 |
| | | | | 52/63 |
| 6,151,852 | A * | 11/2000 | Linn | E04H 17/163 |
| | | | | 52/745.1 |
| 6,811,145 | B2 * | 11/2004 | Gibbs | E04H 17/1439 |
| | | | | 256/72 |
| 7,516,946 | B2 * | 4/2009 | Fumagalli | E04H 17/163 |
| | | | | 256/28 |
| 7,621,510 | B2 * | 11/2009 | Gibbs | E04H 17/1417 |
| | | | | 256/65.1 |
| 7,676,926 | B2 | 3/2010 | Langenwalter | |

(Continued)

FOREIGN PATENT DOCUMENTS

| | | | | | |
|---|---|---|---|---|---|
| CH | | 418045 A * | 7/1966 | ........... | E04H 17/124 |
| FR | | 1318354 A * | 2/1963 | ........... | E04H 17/163 |

(Continued)

OTHER PUBLICATIONS

U.S. Appl. No. 17/158,403, filed Jan. 26, 2021, Langenwalter.

*Primary Examiner* — Matthew R McMahon
(74) *Attorney, Agent, or Firm* — Timothy D. St. Clair; Parker Poe Adams & Bernstein, LLP (57) ABSTRACT

A fence panel comprises a first frame rail that includes a first beam portion and a first fin that is adjacent to the first beam portion, and a barrier component attached to the first fin. A resistance weldment may reside at the attachment between the barrier component and the first fin. The first fin may be integral with the first beam portion. The first frame rail and the first fin may comprise a single roll form or a single extrusion.

25 Claims, 10 Drawing Sheets

(56) References Cited

U.S. PATENT DOCUMENTS

| | | | |
|---|---|---|---|
| 7,677,534 B2 | 3/2010 | Langenwalter | |
| 8,152,141 B2 | 4/2012 | Langenwalter | |
| 8,438,995 B1 * | 5/2013 | Donahue | A01K 1/00 |
| | | | 119/512 |
| 8,833,737 B2 | 9/2014 | Langenwalter | |
| 8,931,761 B2 | 1/2015 | Langenwalter | |
| 9,689,177 B2 | 6/2017 | Langenwalter | |
| 9,995,059 B2 | 6/2018 | Langenwalter | |
| 10,426,056 B1 * | 9/2019 | McNair | E04B 1/34321 |
| 10,584,513 B2 * | 3/2020 | Boado | E04H 17/003 |
| 10,604,962 B1 * | 3/2020 | Givens | E04H 17/161 |
| 10,774,576 B1 * | 9/2020 | Vonnahme | E06B 3/12 |
| 10,961,731 B2 * | 3/2021 | Melic | E04G 21/3233 |
| 10,982,454 B2 * | 4/2021 | Melic | E04G 21/3223 |
| 11,168,489 B2 * | 11/2021 | Callahan | G01B 21/042 |
| 11,261,617 B2 * | 3/2022 | Saltijeral | E04H 17/163 |
| 11,421,441 B2 * | 8/2022 | Howell | E06B 11/04 |
| 11,542,721 B2 * | 1/2023 | Langenwalter | E04H 17/185 |
| 11,773,618 B2 * | 10/2023 | Callahan | B29C 66/81465 |
| | | | 256/33 |
| 11,808,052 B1 * | 11/2023 | Johnson | E04H 17/163 |
| 2006/0231821 A1 * | 10/2006 | Gavin | E06B 11/02 |
| | | | 256/73 |
| 2007/0261333 A1 * | 11/2007 | Behshid | E04H 17/161 |
| | | | 52/236.9 |
| 2007/0267616 A1 | 11/2007 | Langenwalter | |
| 2008/0006808 A1 * | 1/2008 | Thompson | E04H 17/24 |
| | | | 256/45 |
| 2010/0133492 A1 | 6/2010 | Langenwalter | |
| 2010/0288989 A1 * | 11/2010 | Williams | E04H 17/1439 |
| | | | 29/428 |
| 2013/0276389 A1 * | 10/2013 | Marrs | H05K 7/20745 |
| | | | 52/173.1 |
| 2016/0177594 A1 * | 6/2016 | Callahan | E04H 17/05 |
| | | | 256/33 |
| 2019/0226230 A1 | 7/2019 | Langenwalter | |

FOREIGN PATENT DOCUMENTS

| | | | | |
|---|---|---|---|---|
| FR | 2799671 A1 | * | 4/2001 | B21F 27/10 |
| KR | 200367716 Y1 | * | 11/2004 | E04H 17/163 |
| WO | WO-2009023274 A1 | * | 2/2009 | A01K 1/03 |

* cited by examiner

FENCING PANEL

CROSS REFERENCE TO RELATED APPLICATIONS

This application claims the benefit of priority of U.S. Provisional Application Ser. No. 63/181,570, filed on Apr. 29, 2021, which is incorporated herein in its entirety.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIALS SUBMITTED ON A COMPACT DISC OR AS A TEXT FILE VIA THE OFFICE ELECTRONIC FILING SYSTEM

Not applicable.

STATEMENT REGARDING PRIOR DISCLOSURES BY THE INVENTOR OR A JOINT INVENTOR

Not applicable.

BACKGROUND OF THE INVENTION

Field of the Invention

The present disclosure is generally related to fencing panels, and more particularly relates to a fence panel with a frame member having an inboard fin.

Description of the Related Art

Fences have been erected in many and varied styles. It is desirable in some applications for fencing to be partially prefabricated off-site, as prefabrication simplifies installation and reduces costs as a result of, for example, economies of scale. Prefabricated fencing includes barrier sections that may be joined, for example serially, and secured to the ground so as to result in a fence run, also referred to as a "fence line" (even though the fencing need not reside in a straight linear line), that required reduced assembly labor and assembly time on-site.

Modularity of prefabricated fencing panels is also desirable. Inasmuch as plans may be altered during installation of fencing, or additional fencing may be discovered to be desirable after installation of an initial fence run, or later replacement may be desired of a section of fencing damaged after installation, modularity of design would allow easy and aesthetically matching and consistent results.

Optimally, fencing should be of simplified manufacture with a minimum of easily-manufactured components.

A style of premanufactured fencing includes fencing panels that have frame rails located about a portion or the entirety of the panel perimeter and a barrier component within and attached to the frame rails. It has been found, however, that the manufacture of such fencing panels may result in problems. At the time of attaching the barrier component to the frame rails, the barrier component and the frame must be sized such that a reliable connection between the two may be made. But both the frame and the barrier component have ranges of manufacturing tolerances and cannot be manufactured to precise target dimensions. The handling of the barrier component during its fabrication and before connecting it to the frame may result in stretching and/or compression of the barrier component, causing additional dimension problems. The process of attaching the barrier component to the frame, for example by welding, may cause even further dimension irregularities. These dimensioning issues may accumulate and compound, resulting in an total dimensioning mismatch between the barrier component and the frame that may give rise to an unacceptable final fencing panel. For example, if the barrier component is to be welded to the frame, and a 0.8 millimeter welding wire is to be used, the accumulated errors may exceed the capacity of the welding machine to form a reliable attachment of the barrier component to the frame. These accumulated dimension issues result in inability to realize the rapid attachment of the barrier component to the frame, and manual correction or repair may be required. Low production efficiency, poor quality of attachment of the barrier component to the frame, high rejection rates, increased production costs, and inability to meet automatic production requirements ensues.

It would be desirable to have a frame configured to accommodate a range of manufacturing tolerances for both the frame and the barrier component, and to further accommodate changes to the dimensions of the barrier component due to fabrication and due to handling before assembly, and to further still accommodate dimension irregularities caused by the process of attaching the barrier component to the frame, yet still provide for production efficiency, optimized connections between the barrier component and the frame, aesthetically pleasing finished panels, rejection rate reduction, and automation of the production process. However, the fencing products previously known do not ideally address the foregoing objectives.

In view of the foregoing, the present invention relates to an improvement upon the known systems and methods of fencing panels, and provides distinct advantages over the conventional systems and methods.

BRIEF SUMMARY OF THE INVENTION

A fence panel with a frame member having an inboard fin is provided.

In accordance with particular aspects of some embodiments of the present technology, a metal barrier component may be joined to a metal frame by resistance welding between the barrier component and inboard fins extending from the beam portions of the frame rails. The inboard fins may be configured to extend from the frame rails by a distance sufficient (a) to account for and to allow for accumulated and/or compounded dimensioning issues resulting from acceptable manufacturing tolerances of both the frame and the barrier component, stretching and/or compression of the barrier component during fabrication and handling, welding dimension irregularities, and other manufacturing anomalies, and (b) to furnish sufficient contact and attachment between the barrier component and the fins for reliable attachment of the barrier component to the frame as well as to result in production efficiency, aesthetically pleasing completed panels, rejection rate reduction, and automation of the fabrication process.

In accordance with certain aspects of certain embodiments of the present technology, a fence panel may comprise a first frame rail, the first frame rail including a first beam portion and a first fin that is adjacent to the first beam portion, and a barrier component attached to the first fin. Other embodiments of the present technology may also include one or more of the following:

(a) a resistance weldment residing at the attachment between the barrier component and the first fin;
(b) a resistance weldment in contact with both the barrier component and the first fin;
(c) only a resistance weldment resides at the attachment between the barrier component and the first fin;
(d) the first fin is integral with the first beam portion;
(e) the first frame rail and the first fin comprise a single roll form;
(f) the first frame rail and the first fin consist of a single roll form;
(g) the first frame rail and the first fin comprise a single extrusion;
(h) the first frame rail and the first fin consist of a single extrusion;
(i) the first frame rail carries first and second connectors upon the first beam portion, and the first and second connectors reside opposite the first fin;
(j) the fence panel further has a second frame rail that has a second beam portion and a second fin, and the first and second frame rails are identical;
(k) the fence panel further has a second frame rail that has a second beam portion and a second fin, the second frame rail is identical to the first frame rail, the first frame rail carries first and second connectors upon the first beam portion that reside opposite the first fin, and the second frame rail carries third and fourth connectors upon the second beam portion that reside opposite the second fin;
(l) the first frame rail carries first and second hinges upon the first beam portion, the first and second hinges residing opposite the first fin; and/or
(m) the fence panel includes a second frame rail that has a second beam portion and a second fin, the second frame rail is identical to the first frame rail, the first frame rail carries first and second connectors upon the first beam portion that reside opposite the first fin, and the second frame rail carries first and second drop cane collars upon the second beam portion that reside opposite the second fin.

In an alternate embodiment of the present technology, a fence panel may comprise a rectangular perimeter frame having four frame rails, each frame rail including an integral fin. Each integral fin may extend generally toward the other integral fins. A barrier component may be attached to the four integral fins. Certain embodiments of the present technology may also include one or more of the following:

(a) a resistance weldment between and in contact with both the barrier component and one of the four integral fins;
(b) a resistance weldment between the barrier component and the four integral fins;
(c) the four frame rails have indicia of roll forming;
(d) the four frame rails have indicia of extrusion;
(e) one of the four frame rails carries a connector, the connector residing opposite the fin of the one of the four frame rails;
(f) one of the four frame rails carries a hinge, the hinge residing opposite the fin of the one of the four frame rails; and/or
(g) a first of the four frame rails carries a hinge, the hinge residing opposite the fin of the first of the four frame rails, and a second of the four frame rails carries a drop cane collar, the second of the four frame rails being generally parallel to the first of the four frame rails.

In another embodiment of the present technology, a method of making a fence panel may comprise the steps of creating a first frame rail that includes a first fin by one of roll forming and extrusion, creating a second frame rail that includes a second fin by one of roll forming and extrusion, orienting the first and second frame rails such that the first and second fins extend generally toward each other, positioning a barrier component upon both the first and second fins, and joining the barrier component to the first and second fins by resistance welding. Certain embodiments of the present technology may also include one or more of the following steps:

(a) attaching first and second connectors to the first frame rail.
(b) attaching first and second connectors to the first frame rail opposite the first fin and attaching first and second drop cane collars to the second frame rail opposite the second fin; and/or
(c) attaching first and second connectors to the first frame rail opposite the first fin, attaching first and second drop cane collars to the second frame rail opposite the second fin, attaching a latch proximate to the second frame rail, and positioning a drop cane within the first and second drop cane collars.

Additional advantages of the invention will be set forth in part in the description which follows, and in part will be suggested from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention.

The purpose of the Abstract is to enable the United States Patent and Trademark Office, and the public generally, to determine quickly from a cursory inspection the nature of the technical disclosure. The Abstract is not provided for interpreting the scope of the claims herein, nor to define the invention or the application, nor to be limiting in any way as to the scope of the invention.

BRIEF DESCRIPTION OF THE DRAWINGS

The details of the present invention, as to both its structure and its operation, may be understood with reference to the accompanying drawings, in which.

It should be noted that the drawings discussed above and below are not to scale in all instances, but may have exaggerated dimensions in some respect(s) to illustrate the principles of the invention.

DETAILED DESCRIPTION OF REPRESENTATIVE EMBODIMENTS

What follows are descriptions of preferred embodiments of a fencing panel in accordance with the present invention. In describing the embodiments illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose. Where like elements have been depicted in multiple embodiments, identical reference numerals have been used in the multiple embodiments for ease of understanding.

The invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting.

Enumeration may be used in the description of various embodiments but, unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

The use of "including," "comprising," and "having," and variations of each, is meant to encompass the items listed thereafter and equivalents thereof as well as additional items and equivalents thereof.

As used herein, the singular forms "a," "an" and "the" are intended to include the plural forms as well, unless the context clearly indicates otherwise. The terms "comprise" and variations thereof specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "horizontal" refers to an orientation generally parallel to the horizon, and the term "vertical" refers to an orientation perpendicular to horizontal and generally perpendicular to the horizon. As used herein, the terms "upper," "above," "top," and like terms refer to a direction relatively further from Earth as the fencing panel is, or is to be, used. The term "lower," "below," "bottom," and like terms refer to the direction opposite "upper," a direction relatively closer to Earth as the fencing is, or is to be, used.

Unless specified or limited otherwise, as used herein the terms "connect," "support," "couple," "carry," and variations thereof are used broadly and encompass direct and indirect connections and couplings; further, such terms are not restricted to physical or mechanical connections and couplings.

As used herein, the term "proximate" means "near or close to," "at or near." "Proximate" may include, but is not limited to, "next to" or "adjacent."

As used herein, the term "integral" and variations thereof means formed together as a unit, made as a single unit, formed of and as and in one piece, formed in a single piece, formed in the same process, of one-piece construction, formed of a unitary single piece, created as a single complete unit, and/or physically a one-piece construction. The term "integral" and variations thereof includes, but is not limited to, made from the same material and/or of the same composition. To further define the term "integral" and variations thereof as used herein, a component comprising two pieces that are individually made and then permanently affixed together are not "integral." "Integral" may further be understood to not include within its definition "formed separately then combined or joined," a separate element attached, "two or more distinct pieces that are permanently attached," a separate element attached to, separate components that are integrated into one component, or separate components that are combined.

As used herein, the term "indicia" and variations thereof means "signs, indications, or distinguishing marks."

As used herein, the terms "inwardly" and "inboard" refers to that direction toward the middle of a fence panel. The term "outwardly" and "outboard" refer to that direction opposite of inboard, that direction away from the middle of a fence panel. The term "longitudinal" and variations thereof refer to the direction generally parallel to the length of a fence panel; the term "transverse" refers to the direction generally perpendicular to longitudinal.

Examples of fencing are included in the disclosures of U.S. Pat. Nos. 9,995,059; 9,689,177; 9,027,909; 8,931,761; 8,833,737; 8,152,141; 7,677,534; and 7,676,926, and in U.S. Published Apps. 2019/0226230; 2010/0133492; and 2007/0267616, and in U.S. application Ser. No. 17/158,403, the full disclosures of each of which are incorporated herein by reference.

A fencing panel, generally 10, provided. The following aspects may be referenced:

panel 10
frame 20
first frame rail 21
second frame rail 22
third frame rail 23 fourth frame rail 24
first beam portion 25
second beam portion 26
third beam portion 27
fourth beam portion 28
first fin 31
second fin 32
third fin 33
fourth fin 34
barrier component 40
weldment or adhesive 41*a*, 41*b*, 41*c*, 41*d*
extrusion indicia 42*a*, 42*b*
roll forming indicia 43*a*, 43*b*
first connector 51
second connector 52
third connector 53
fourth connector 54
aperture 55
concavity 56
first hinge 61
second hinge 62
third hinge 63
fourth hinge 64
first drop cane collar 71
second drop cane collar 72
notch 73
collar bore 74
latch 80
first leg 81
second leg 82
first end 83
second end 84
angle C
crossbar 85
latch hole 86
drop cane 90
stem 91
first stem end 92
second stem end 93
first arm 94
second arm 95
knob 96
distance E Fencing panel 10 may include a frame 20 and a barrier component 40. The frame 20 may include one or more frame rails, such as a first frame 21, a second frame rail 22, a third frame rail 23, and a fourth frame rail 24.

Each frame rail may include a beam portion and a fin. For example, first frame rail 21 mail include a first beam portion 25 and a first fin 31.

The beam portion of a frame rail may have one or more of many cross-section shapes. For example first beam portion 25 of first frame rail 21 may have a circular, rectangular, elliptical, or polygonal cross-section shape. For a second example, a frame rail such as first frame rail 21 may have a T-shaped cross-section, the beam portion, such as first beam portion 25, forming the cross member of the T-shape and the fin, such as first fin 31, forming the post member of the T-shape. For a third example, a frame rail such as first frame rail 21 may have an L-shaped cross-section, the beam portion, such as first beam portion 25, forming the vertical member of the L-shape and the fin, such as first fin 31, forming the horizontal member of the L-shape. For a fourth example, first beam portion 25 of first frame rail 21 may have a first cross-section shape at a first location along the length of first frame rail 21 and a second, different cross-section shape at a second location along the length of first frame rail 21. For another example, first beam portion 25 may be solid across its cross-section at a first location along the length of first frame rail 21 and it may be hollow, or, alternatively, inclusive of a solid portion across only a fraction in its interior across its cross-section, at a second location along the length of first frame rail 21. Other cross-section shapes may be practiced for the frame rail of the subject technology, within the scope of this invention.

A fin may be of various configurations. For example, a first fin 31 may be a generally planar, generally rectilinear shape, although other configurations may be used in particular applications. A fin, for example first fin 31, may extend along the full length of a frame rail, in this example first frame rail 21, or alternatively it may extend along only a portion of the full length of a frame rail (not shown). In some embodiments, plural fins, for example first fin 31*a* and second fin 31*b* (not shown), may each extend collinearly along separate portions of the length of a single frame rail, in this example first frame rail 21. In any such configuration, the fin, for example first fin 31, may reside on the inboard aspect of the beam portion, in this example first beam portion 25 of first frame rail 21, between the middle of a fence panel 10 and first beam portion 25.

In some embodiments of frame rails, such as first frame rail 21, the beam portion such as first beam portion 25 and the fin such as first fin 31 are nonintegral, the first fin 31 having been connected or coupled to the first beam portion 25. Such connection or coupling may be accomplished by adhesive, weldment, a fastener such as a screw or bolt or rivet, a dowel, snap fit engagement, clip, joint, any combinations thereof, or other connection method. If by weldment, such connection or coupling may be accomplished by, for examples, argon arc welding, gas shield welding, heat welding, or sonic welding.

In some embodiments of frame rails, such as first frame rail 21, the beam portion such as first beam portion 25 and the fin such as first fin 31 may be of the same material. In other embodiments, the beam portion may be of a first material and the fin of a second material. Still further, in particular instances a beam portion may of two or more materials; similarly, a fin may be of two or more materials. Materials for such beam portions and fins may be selected from one or more of a metal, an alloy, wood, glass, fiberglass, plastic, vinyl, and polyvinyl chloride (PVC).

In specific embodiments of frame rails, such as first frame rail 21, the beam portion such as first beam portion 25 and the fin such as first fin 31 may be integral. In certain of such embodiments, the frame rail may have been roll formed—the beam portion and the fin comprise a single roll form. In other of such embodiments, the frame rail may have been extruded—the beam portion and the fin comprise a single extrusion. Such roll formed embodiments may have indicia of roll forming; those with skill in the art may detect the presence of markings such as longitudinal markings, bend lines, and the like, telling of roll forming, as well as the absence of other markings telling of extrusion, casting, molding, or other methods of fabrication. Such extruded embodiments may have indicia of roll forming; those with skill in the art may detect the presence of markings such as circumferential markings and the like, telling of extrusion, as well as the absence of other markings telling of roll forming, casting, molding, or other methods of fabrication.

The barrier component 40 may be of metal or of nonmetal. It may be fencing fabric, polymeric substrate, metal and nonmetal netting, woven metal and nonmetal wires, chain link, spaced vertical rods or wires attached to spaced horizontal rods or wires, lattice-welded members, solid or non-perforated panels, and the like. Particular embodiments of barrier element 40 are illustrated in the drawings and referenced herein, but such embodiments are exemplary only and not limiting of the subject technology.

A panel 10 may thus be configured. A barrier component 40 may be attached to a first frame rail 21 having a first beam portion 25 and a first fin 31, by attaching the barrier component 40 to the first fine 31. In more detail, barrier component 40 may be positioned upon the first fin 31, in contact therewith, and attached to first fine 31. In a particular method, barrier component 40 may be positioned upon the first fin 31, in contact therewith, and attached to first fine 31 by resistance welding, such that a resistance weldment thereby resides at the attachment at, in contact with, and/or between the barrier component 40 and the first fin 31.

Still further, a panel 10 may thus be configured by use of two or more frame rails, such as first frame rail 21 and second frame rail 22. A barrier component 40 may be attached to a first frame rail 21 having a first beam portion 25 and a first fin 31, by attaching the barrier component 40 to the first fin 31, and also attached to a second frame rail 22 having a second beam portion 26 and a second fin 32, by attaching the barrier component 40 to the second fin 32. In more detail, in some embodiments barrier component 40 may be positioned upon the first fin 31 and upon the second fin 32, in contact with both first fin 31 and second fin 32, and attached to first fin 31 and to second fin 32. In a particular method, barrier component 40 may be positioned upon the first fin 31 and upon the second fin 32, in contact with both first fin 31 and second fin 32, and attached to first fine 31 and to second fin 32 by resistance welding, such that a first resistance weldment thereby resides at the attachment at, in contact with, and/or between the barrier component 40 and the first fin 31 and a second resistance weldment thereby resides at the attachment at, in contact with, and/or between the barrier component 40 and the second fin 32; in this particular method, barrier component 40 may be positioned upon the first fin 31 and upon the second fin 32, in contact with both first fin 31 and second fin 32, and an electric current conducted through the barrier component 40 and the first fin 31 and the second fin 32, such that a first resistance weldment thereby forms and resides at the attachment at, in contact with, and/or between the barrier component 40 and the first fin 31 and a second resistance weldment thereby forms and resides at the attachment at, in contact with, and/or between the barrier component 40 and the second fin 32.

Figure 1:
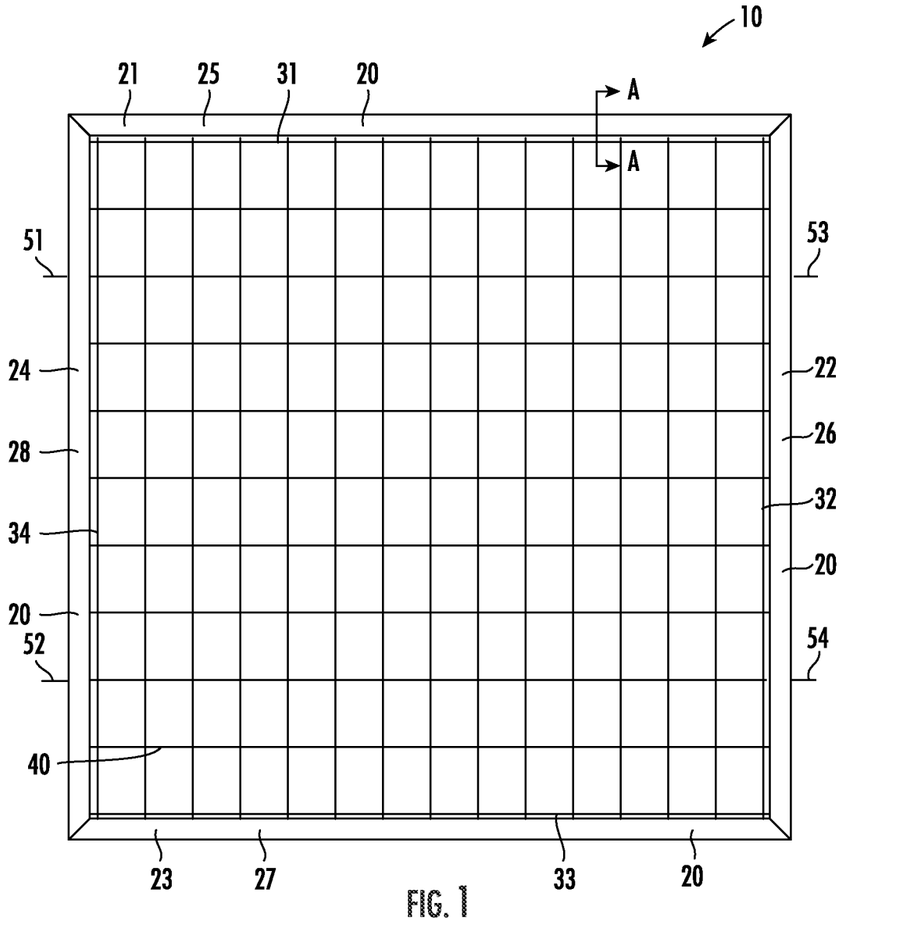
FIG. 1 is a front elevation view of a fencing panel according to an embodiment of the present invention.

The details of the present invention may be further understood with reference to the figures. FIG. 1 illustrates an embodiment of a fencing panel 10. The perimeter of the embodiment of FIG. 1 is of a rectangular shape, but other shapes of perimeters may be used in accordance with this technology, including but not limited to polygonal shapes with greater than the four sides illustrated in FIG. 1 and polygonal shapes with fewer than the four sides illustrated in FIG. 1.

The fencing panel of FIG. 1 includes a first frame rail 21, a second frame rail 22, a third frame rail 23, and a fourth frame rail 24. Each of the frame rails 21, 22, 23, and 24 illustrated in FIG. 1 are linear, but other configurations of frame rails may be used in accordance with this technology, including curvilinear rails, rails irregular along their lengths, and combinations thereof.

First frame rail 21 of the embodiment of a fencing panel of FIG. 1 includes a first beam portion 25 and a first fin 31. Second frame rail 22 of the embodiment of a fencing panel of FIG. 1 includes a second beam portion 26 and a second fin 32. Third frame rail 23 of the embodiment of a fencing panel of FIG. 1 includes a third beam portion 27 and a third fin 33. Fourth frame rail 24 of the embodiment of a fencing panel of FIG. 1 includes a fourth beam portion 28 and a fourth fin 34.

The example in FIG. 1 illustrates fins that extended along the full length of the frame rail with which they are associated. More specifically, first fin 31 extends along the full length of first frame rail 21, second fin 32 extends along the full length of second frame rail 22, third fin 33 extends along the full length of third frame rail 23, and fourth fin 34 extends along the full length of fourth frame rail 24.

In the embodiment illustrated in FIG. 1, first fin 31 resides on the inboard aspect of first beam portion 25, between the middle of fence panel 10 and first beam portion 25, and extends generally toward the second fin 32, third fin 33, and fourth fin 34. Second fin 32 resides on the inboard aspect of second beam portion 26, between the middle of fence panel 10 and second beam portion 26, and extends generally toward the first fin 31, third fin 33, and fourth fin 34. Third fin 33 resides on the inboard aspect of third beam portion 27, between the middle of fence panel 10 and third beam portion 27, and extends generally toward the first fin 31, second fin 32, and fourth fin 34. Fourth fin 34 resides on the inboard aspect of fourth beam portion 28, between the middle of fence panel 10 and fourth beam portion 28, and extends generally toward the first fin 31, second fin 32, and third fin 33.

With the fencing panel of FIG. 1, one end of first frame rail 21 has been connected to one of the ends of second frame rail 22, while the other end of first frame rail 21 has been connected to one of the ends of fourth frame rail 24. Similarly, one end of third frame rail 23 has been connected to the other of the ends of second frame rail 22, while the other end of third frame rail 23 has been connected to the other of the ends of fourth frame rail 24.

In the embodiment illustrated in FIG. 1, first frame rail 21 is oriented generally parallel to third frame rail 23, and second frame rail 22 is oriented generally parallel to fourth frame rail 24.

The embodiment of panel 10 illustrated in FIG. 1 includes a first connector 51 and a second connector 52 disposed outboard upon fourth frame rail 24. Additionally, the embodiment of panel 10 illustrated in FIG. 1 includes a third connector 53 and a fourth connector 54 disposed outboard upon second frame rail 22. In some applications, connectors 51, 52, 53, and 54 may be of a configuration illustrated in FIGS. 7 and 8. Connectors, such as connectors 51, 52, 53, and 54, may facilitate receipt of a fence post (not shown) and/or may facilitate interconnecting panel 10 with an adjacent fencing panel having similar connectors (not shown).

The fencing panel illustrated by FIG. 1 further includes a barrier component 40. Barrier component 40 has been attached to the first frame rail 21 by attaching the barrier component 40 to the first fin 31. Barrier component 40 has also been attached to the second frame rail 22 by attaching the barrier component 40 to the second fin 32. Barrier component 40 has been attached to the third frame rail 23 by attaching the barrier component 40 to the third fin 33. And barrier component 40 has been attached to the fourth frame rail 24 by attaching the barrier component 40 to the fourth fin 34.

Figure 2:
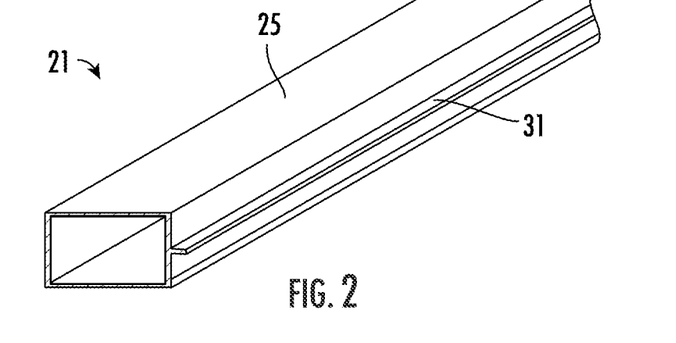
FIG. 2 is a perspective cross-section view, taken at A:A in FIG. 1, of a frame rail according to an embodiment of the present invention.

FIG. 2 illustrates an embodiment of a frame rail 21. The embodiment of FIG. 2 has a first beam portion 25 with a rectangular cross-section. First fin 31 resides along first beam portion 25 and is of a generally planar, generally rectilinear shape. The frame rail 21 of FIG. 2 illustrates a frame rail 21 in which first beam portion 25 and first fin 31 are not integral—first fin 31 has been connected to first beam portion 25.

Figure 3:
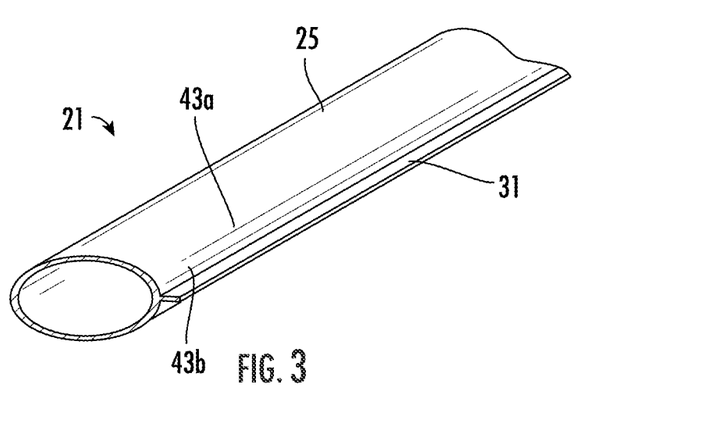
FIG. 3 is a perspective cross-section view, taken at A:A in FIG. 1, of a frame rail according to an embodiment of the present invention.

FIG. 3 illustrates an embodiment of a frame rail 21. The embodiment of FIG. 2 has a first beam portion 25 with an elliptical cross-section. First fin 31 resides along first beam portion 25 and is of a generally planar, generally rectilinear shape. FIG. 3 also illustrates a first frame rail 21 bearing indicia of roll forming 43a, 43b. The frame rail 21 of FIG. 3 illustrates a frame rail 21 in which first beam portion 25 and first fin 31 are integral.

Figures 4, 5:
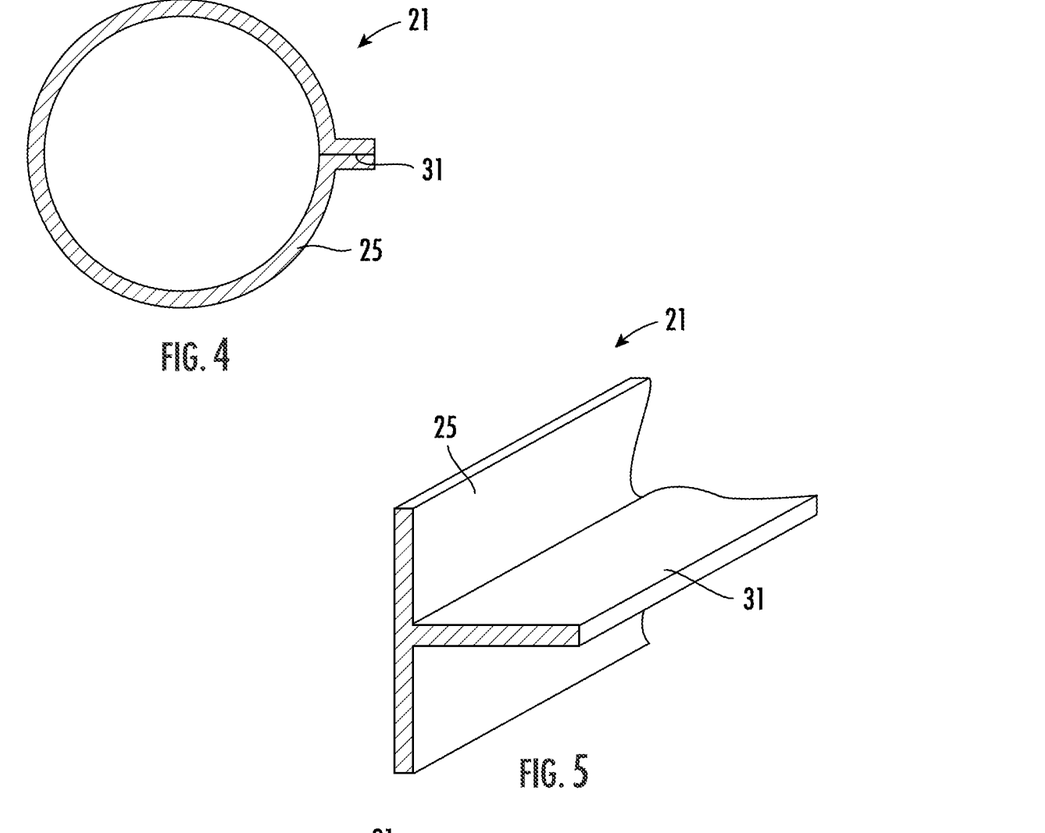
FIG. 4 is a perspective cross-section view, taken at A:A in FIG. 1, of a frame rail according to an embodiment of the present invention.
FIG. 5 is a perspective cross-section view, taken at A:A in FIG. 1, of a frame rail according to an embodiment of the present invention.

FIG. 4 illustrates an embodiment of a frame rail 21 with a first beam portion 25 having a circular cross-section. First fin 31 resides along first beam portion 25. The embodiment of FIG. 4 has a first beam portion 25 and a first fin 31 that are integral. In certain of such embodiments, the frame rail 21 of FIG. 4 has been roll formed—the first beam portion 25 and the first fin 31 comprise a single roll form as suggested in FIG. 4. In other of such embodiments, the frame rail 21 of FIG. 4 has been extruded—the first beam portion 25 and the first fin 31 comprise a single extrusion.

FIG. 5 illustrates an embodiment of a frame rail 21 with a first beam portion 25 having a T-shaped cross-section. First fin 31 resides along first beam portion 25. The embodiment of FIG. 5 has a first beam portion 25 and a first fin 31 that are integral. In certain of such embodiments, the frame rail 21 of FIG. 5 has been roll formed—the first beam portion 25 and the first fin 31 comprise a single roll form as suggested in FIG. 5. In other of such embodiments, the frame rail 21 of FIG. 5 has been extruded—the first beam portion 25 and the first fin 31 comprise a single extrusion.

Figure 6:
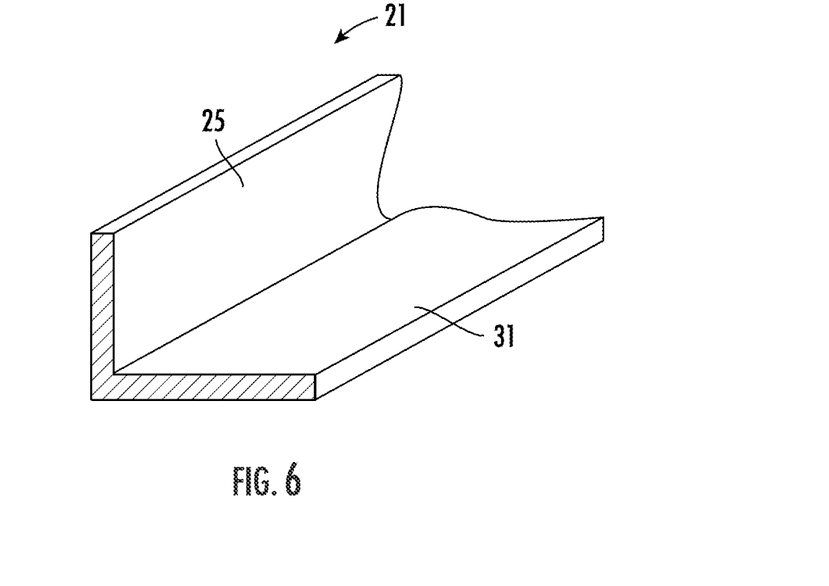
FIG. 6 is a perspective cross-section view, taken at A:A in FIG. 1, of a frame rail according to an embodiment of the present invention.

FIG. 6 illustrates an embodiment of a frame rail 21 with a first beam portion 25 having an L-shaped cross-section. First fin 31 resides along first beam portion 25. The embodiment of FIG. 6 has a first beam portion 25 and a first fin 31 that are integral. In certain of such embodiments, the frame rail 21 of FIG. 6 has been roll formed—the first beam portion 25 and the first fin 31 comprise a single roll form as suggested in FIG. 6. In other of such embodiments, the frame rail 21 of FIG. 6 has been extruded—the first beam portion 25 and the first fin 31 comprise a single extrusion.

Figure 7:
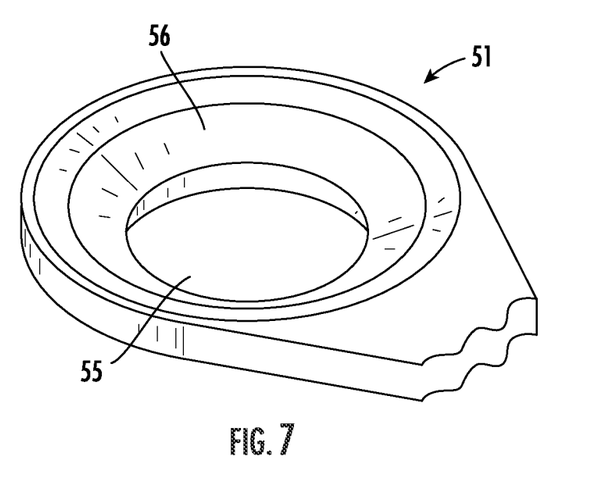
FIG. 7 is a perspective view of a connector according to an embodiment of the present invention.
Figure 8:
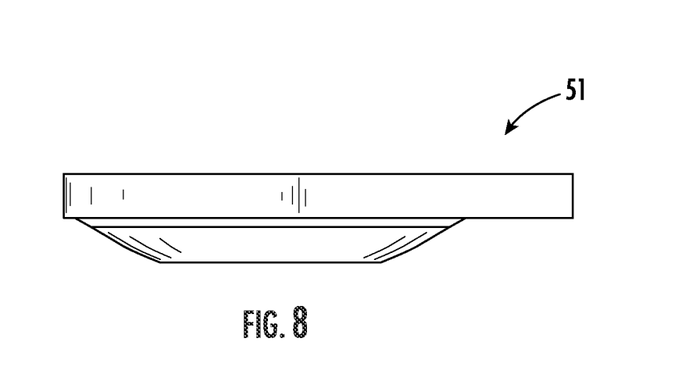
FIG. 8 is a side elevation view of a connector according to an embodiment of the present invention.

FIGS. 7 and 8 illustrate a connector, such as first connector 51; second connector 52, third connector 53, and/or fourth connector 54 may be of the same configuration, or of a different configuration, as that suggested in FIGS. 7 and 8 of first connector 51. The illustrated first connector 51 includes an aperture 55 that allows for passage therethrough of a post or stake so as to erect a panel 10 and/or so as to connect a first panel 10a to a second panel 10b. The connector, such as first connector 51, may also include an upper concavity 56 or other(s) of the configurations disclosed in U.S. application Ser. No. 17/158,403, the full disclosure of which being incorporated by reference herein.

Figure 9:
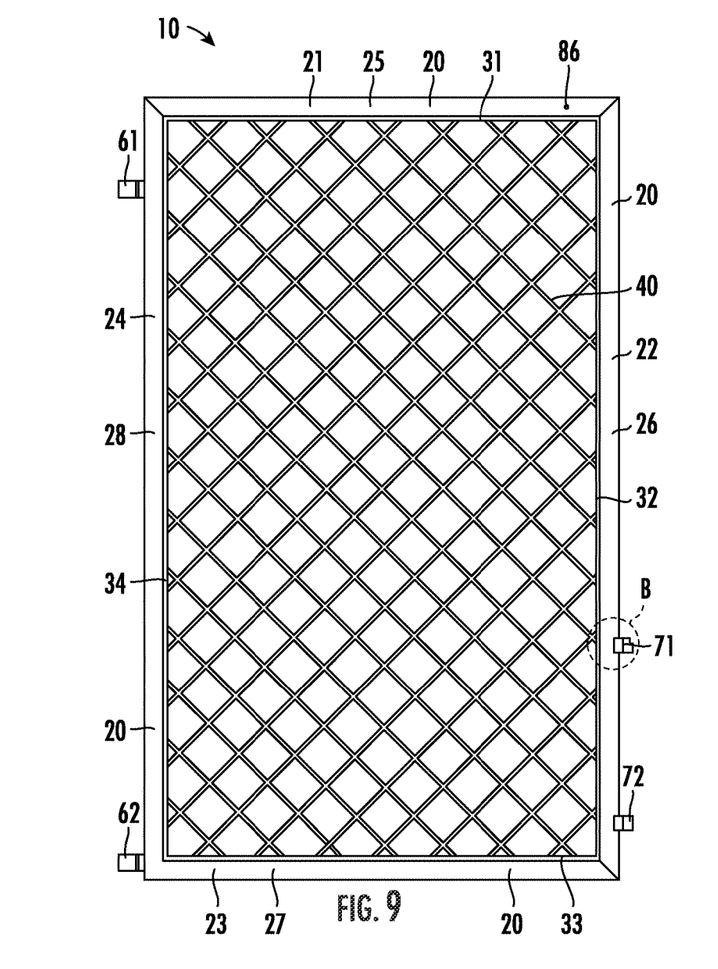
FIG. 9 is a front elevation view of a fencing panel according to an embodiment of the present invention.

FIG. 9 illustrates a fencing panel 10, similar to that described hereinabove as to FIG. 1, that does not include first connector 51, second connector 52, third connector 53, or fourth connector 54. Instead the fencing panel 10 of FIG. 9 includes a first hinge 61 and a second hinge 62, each carried upon fourth frame rail 24. So configured, the fencing panel 10 of FIG. 9 may be used as a gate, rotatable about first hinge 61 and second hinge 62 if a post or stake has been inserted through first hinge 61 and second hinge 62, first hinge 61 and second hinge 62 each having a bore therethrough (not shown) that is parallel to fourth frame frail 24 and the two bores together have collinear axes.

The fencing panel 10 of FIG. 9 further includes a first drop cane collar 71 and a second drop cane collar 72, each carried upon second frame rail 22. As illustrated, first drop cane collar 71 and second drop cane collar 72 are each configured to receive therethrough a drop cane, such as the stem 91 of the drop cane 90 suggested in FIG. 14.

Figure 10:
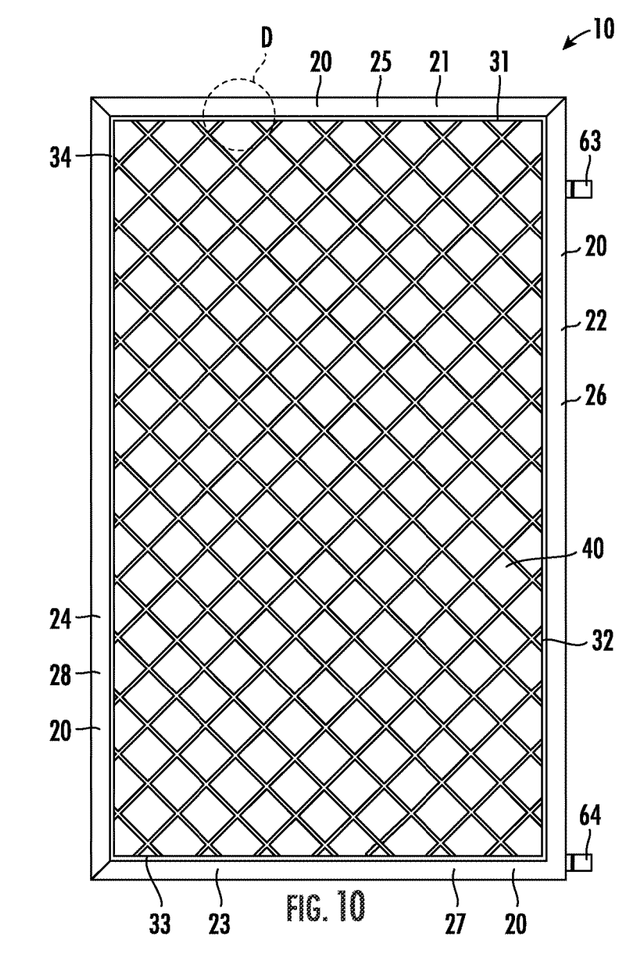
FIG. 10 is a front elevation view of a fencing panel according to an embodiment of the present invention.

FIG. 10 illustrates another fencing panel 10, similar to that described hereinabove as to FIG. 9, that differs from that illustrated in FIG. 9 in that the fencing panel 10 of FIG. 10 does not include first drop cane collar 71 and a second drop cane collar 72. The fencing panel 10 of FIG. 9 includes a third hinge 63 and a fourth hinge 64, each carried upon second frame rail 22. So configured, the fencing panel 10 of FIG. 10 may be used as a gate, rotatable about third hinge 63 and fourth hinge 64 if a post or stake has been inserted through third hinge 63 and fourth hinge 64, third hinge 63 and fourth hinge 64 each having a bore therethrough (not shown) that is parallel to second frame frail 22 and the two bores together have collinear axes.

Figure 11:
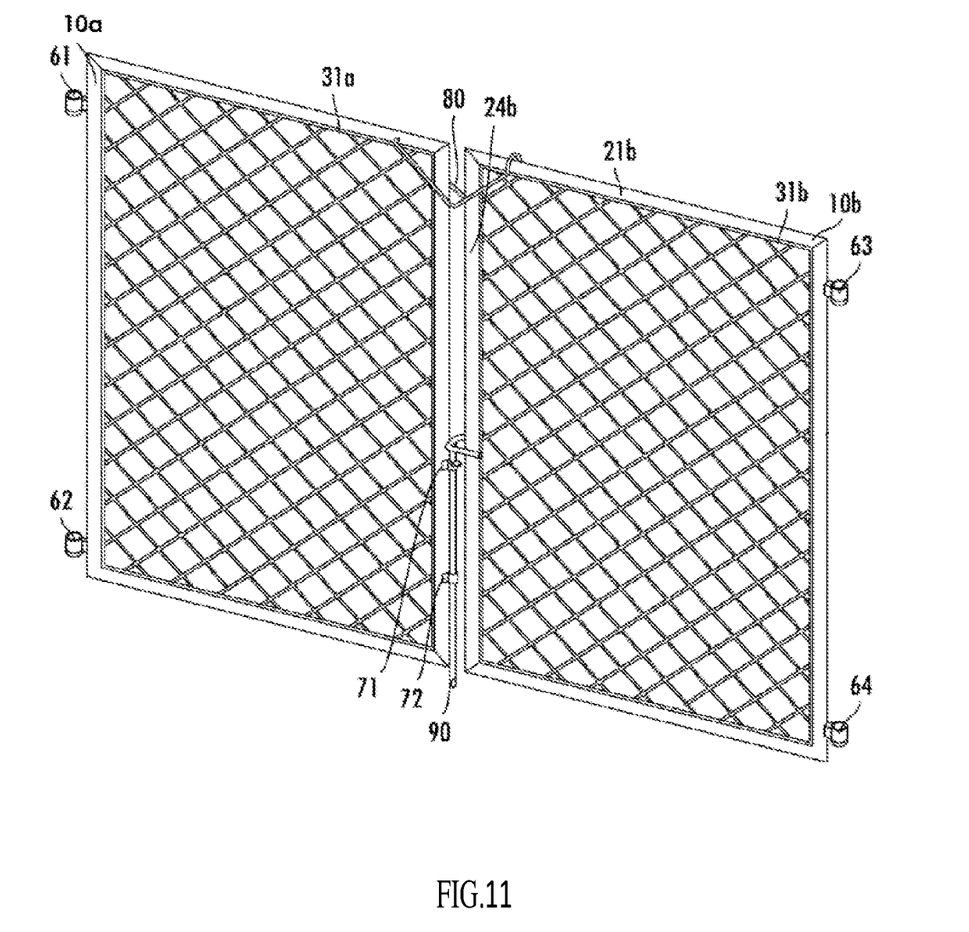
FIG. 11 is a perspective view of two fencing panels according to an embodiment of the present invention.

FIG. 11 suggests the use of two fence panels 10, in this illustration fence panel 10a and fence panel 10b, adjacent each other to form a double gate. In a particular application, the fence panels 10 described hereinabove as suggested in FIGS. 9 and 10 may be disposed adjacent each other to form a double gate as suggested in FIG. 11.

Further, FIG. 11 illustrates that a latch 80 may be attached to one of the fence panels 10, such as to fence panel 10a of FIG. 11, to connect the two fence panels 10a, 10b together in a closed position. Latch 80 may be attached to latch hole 86 as illustrated in FIG. 9.

FIG. 11 also illustrates that a drop cane 90 may be attached to one of the fence panels 10, such as to fence panel 10A of FIG. 11, by fitting the stem 91 through a first drop cane collar 71 and through a second drop cane collar 72.

Thus, as to the embodiment illustrated in FIG. 11, if latch 80 is rotated upward about latch hole 86 and if drop cane 90 is rotated within first drop cane collar 71 and second drop cane collar 72, panel 10a may be rotated about first hinge 61 and second hinge 62 relative to panel 10b, and/or panel 10b may be rotated about third hinge 62 and fourth hinge 64 relative to panel 10a.

Figure 12:
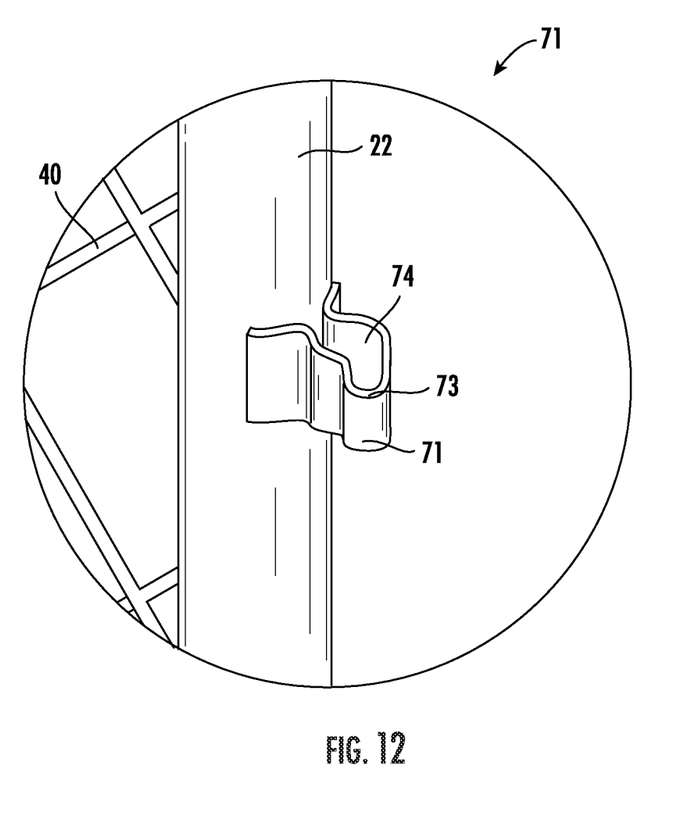
FIG. 12 is an enlarged perspective view of a drop cane collar, taken at B in FIG. 9, according to an embodiment of the present invention.

FIG. 12 is an enlarged perspective view of a drop cane collar, such as first drop cane collar 71, taken at B in FIG. 9, according to an embodiment of the present invention. First drop cane collar 71 includes a collar bore 74 through which a drop cane may be placed, such as the stem 91 of the drop cane 90 suggested in FIG. 14. First drop cane collar 71 may also include a notch 73, notch 73 configured to receive therein a knob, such as knob 96, of a drop cane such as drop cane 90. If a stem 91 of a drop cane 90 is disposed through the collar bore 74 of a first drop cane collar 71, and if the drop cane 90 includes a knob 96, the knob 96 may be positioned within the notch 73. So assembled, drop cane 90 would be prevented from rotating within collar bore 74 by knob 96 residing within the notch 73. Thus, if the drop cane 90 also included a first arm 94 and/or a second arm 95, and first arm 94 and/or second arm 95 were disposed proximate to a post (not shown) or proximate to a fourth frame rail 24, for example, of an adjacent panel 10 (such as panel 10b of FIG. 11), the drop cane 90 would prevent panel 10 (such as panel 10a and/or panel 10b of FIG. 11) from movement relative to the proximate post or relative to the proximate adjacent panel. For example, in the embodiment suggested in FIG. 11, stem 91 of the drop cane 90 has been placed within first drop cane collar 71 and second drop cane collar 72. Drop cane 90 includes a knob 96 that resides within notch 73 of first drop cane collar 71; therefore, drop cane 90 is prevented from rotating within first drop cane collar 71 and second drop cane collar 72 by reason of knob 96 residing within notch 73. Drop cane 90 also includes a first arm 94 disposed on a first side of fourth fencing rail 24b of fencing panel 10b, and a second arm 95 disposed on the side opposite the first side of fourth fencing rail 24b of fencing panel 10b. So configured, fencing panel 10a is prevented from rotating about first hinge 61 and second hinge 62 relative to fencing panel 10b, because of first arm 94 and second arm 95 residing on either side of fourth fencing rail 24b and because knob 96 resides within notch 73 thereby preventing rotation of drop cane 90 within first drop cane collar 71 and second drop cane collar 72. Similarly, fencing panel 10b is prevented from rotating about third hinge 63 and fourth hinge 64 relative to fencing panel 10a, because of first arm 94 and second arm 95 residing on either side of fourth fencing rail 24b and because knob 96 resides within notch 73 thereby preventing rotation of drop cane 90 within first drop cane collar 71 and second drop cane collar 72.

Figure 13:
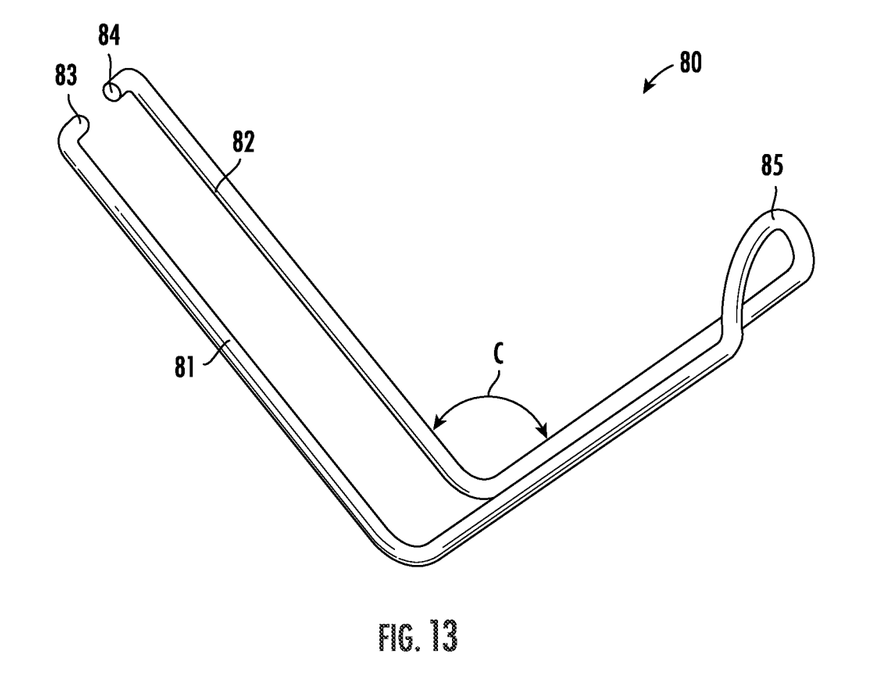
FIG. 13 is a perspective view of a latch according to an embodiment of the present invention.

FIG. 13 illustrates an embodiment of a latch 80, such as the latch 80 suggested in FIG. 11. Latch 80 may include a first leg 81 and a second leg 82. First leg 81 and second leg 82 may each be bent along their respective lengths at an angle C. First leg 81 may terminate at one end at a first end 83. Second leg 82 may terminate at one end at a second end 84. Crossbar 85 may bridge between the respective other ends of first leg 81 and second end 82. In use, first end 83 of first leg 81 may be placed in latch hole 86 (see FIG. 9) in a fencing panel, for example panel 10a of FIG. 11. Second end 84 of second leg 82 may similarly be placed in a latch hole (not shown). So placed, latch 80 may be rotated about first end 83, second end 84. The latch holes, for example latch hole 86, may be located such that latch 80 extends to an adjacent fencing panel, for example fencing panel 10b of FIG. 11, with crossbar 85 resting upon first frame rail 21b of fencing panel 10b. Considering the locations of the bends at angle C along the lengths of first leg 81 and second leg 82, latch 80 would thereby extend across the adjacent fencing panels, for example fencing panels 10a, b of FIG. 11, and thereby inhibit the panels from being rotated in a horizontal plane relative to each other.

Figure 14:
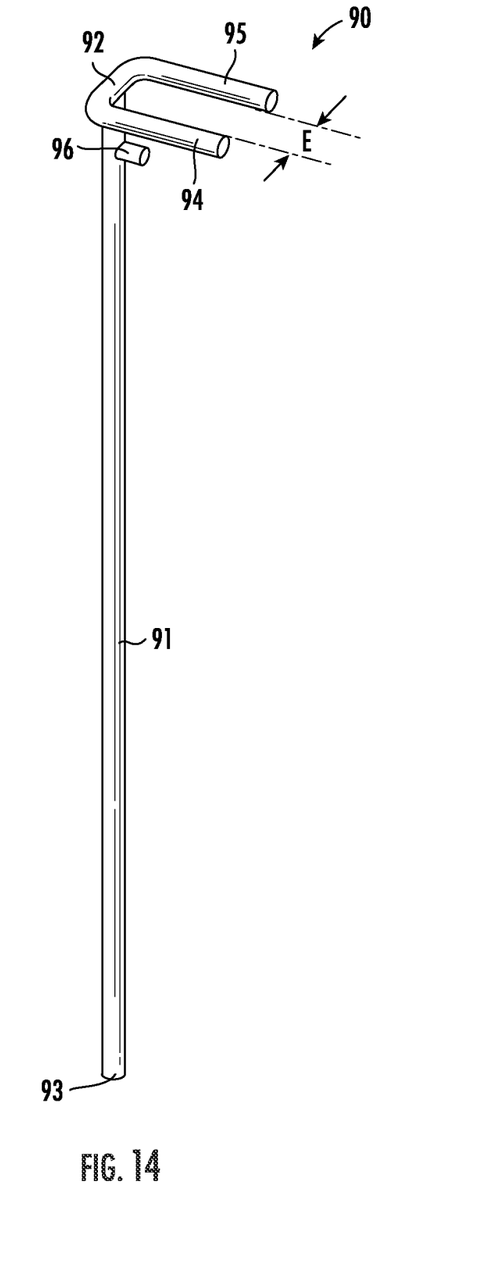
FIG. 14 is a perspective view of a drop cane according to an embodiment of the present invention.

FIG. 14 suggests an embodiment of a drop cane 90. In the illustrated embodiment, drop cane 90 includes a stem 91, a first stem end 92, a second stem end 93, a first arm 94, and a second arm 95. A knob 96 projects from the stem 91. In particular applications, a panel 10 may carry a first drop cane collar 71 and, in specific configurations, a second drop cane collar 72. The drop cane collars may have a collar bore 74 sized to receive therethrough the stem 91. First drop cane collar 71 may include a notch 73, notch 73 being sized to receive therein knob 96. First arm 94 and second arm 95 may be positioned to define between them a distance D, distance E being greater than a cross-sectional width of a frame rail, such as fourth frame rail 24b as illustrated in FIG. 11. By use of a drop cane 90 so configured and used as suggested in FIGS. 11 and 14, fencing panel 10a may be prevented from rotating about first hinge 61 and second hinge 62 relative to fencing panel 10b, because of first arm 94 and second arm 95 reside on either side of fourth fencing rail 24b and because knob 96 resides within notch 73 thereby preventing rotation of drop cane 90 within first drop cane collar 71 and second drop cane collar 72. Similarly, fencing panel 10b may prevented from rotating about third hinge 63 and fourth hinge 64 relative to fencing panel 10a, because of first arm 94 and second arm 95 reside on either side of fourth fencing rail 24b and because knob 96 resides within notch 73 thereby preventing rotation of drop cane 90 within first drop cane collar 71 and second drop cane collar 72.

Figure 15:
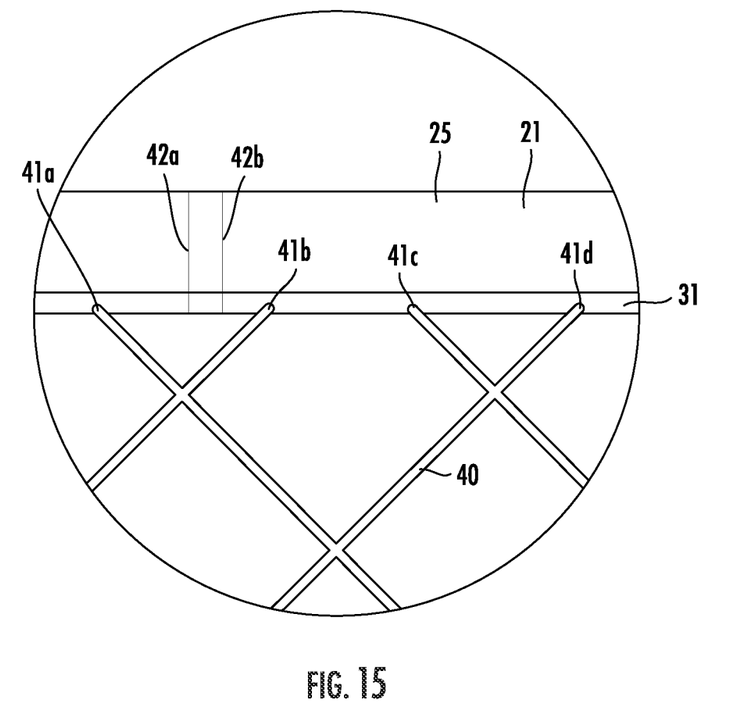
FIG. 15 is an enlarged front elevation view, taken at D in FIG. 10, of a fencing panel according to an embodiment of the present invention.

FIG. 15 is an enlarged front elevation view of a fencing panel according to certain embodiments of the present invention. In an embodiment in which barrier component 40 has been welded to first fin 31, weldments reside at 41a, 41b, 41c, and 41d. In an embodiment in which barrier component 40 has been joined to first fin 31 by resistance welding, resistance weldments reside at 41a, 41b, 41c, and 41d. In an embodiment in which barrier component 40 has been joined to first fin 31 by adhesive, adhesive resides at 41a, 41b, 41c, and 41d. FIG. 15 also illustrates a first frame rail 21 bearing indicia of extrusion 42a, 42b.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims.

The invention claimed is:
1. A fence panel, comprising:
 a first frame rail, the first frame rail including:
  a first beam portion that defines a closed and hollow cross-section that has a center, the closed and hollow cross-section being one of circular, rectangular, elliptical, or polygonal; and
  a first fin that is adjacent to the first beam portion the first fin residing in a plane that includes the center;
 a barrier component, the barrier component having at least one of (a) a desired, predetermined length and defining an actual length that is different than the desired, predetermined length as a result of stretching or compression of the barrier component and (b) a desired, predetermined width and defining an actual width that is different than the desired, predetermined width as a result of stretching or compression of the barrier component;
 the first fin extending from the first frame rail by a distance sufficient to allow for attachment of the barrier component to the first fin with the barrier component including the difference between the barrier component desired, predetermined length and actual length and/or the difference between the barrier component desired, predetermined width and actual width; and
 wherein a weldment resides at the attachment between the barrier component and the first fin.

2. The fence panel of claim 1, wherein a resistance weldment resides at the attachment between the barrier component and the first fin.

3. The fence panel of claim 1, wherein a resistance weldment resides between and is in contact with both the barrier component and the first fin.

4. The fence panel of claim 1, wherein only a resistance weldment resides between the barrier component and the first fin at the attachment.

5. The fence panel of claim 1, wherein the first fin is integral with the first beam portion.

6. The fence panel of claim 1, wherein the first frame rail and the first fin comprise a single roll form.

7. The fence panel of claim 1, the first frame rail and the first fin consisting of a single roll form.

8. The fence panel of claim 1, wherein the first frame rail and the first fin comprise a single extrusion.

9. The fence panel of claim 1, the first frame rail and the first fin consisting of a single extrusion.

10. The fence panel of claim 1, wherein the first frame rail carries first and second connectors upon the first beam portion, the first and second connectors residing opposite the first fin.

11. The fence panel of claim 1, the fence panel further having a second frame rail that has a second beam portion and a second fin, wherein the first and second frame rails are identical.

12. The fence panel of claim 1, wherein:
the fence panel further has a second frame rail that has a second beam portion and a second fin;
the second frame rail is identical to the first frame rail;
the first frame rail carries first and second connectors upon the first beam portion that reside opposite the first fin; and
the second frame rail carries third and fourth connectors upon the second beam portion that reside opposite the second fin.

13. The fence panel of claim 1, wherein the first frame rail carries first and second hinges upon the first beam portion, the first and second hinges residing opposite the first fin.

14. The fence panel of claim 1, wherein:
the fence panel includes a second frame rail that has a second beam portion and a second fin, and the second frame rail is identical to the first frame rail;
the first frame rail carries first and second connectors upon the first beam portion; and
the second frame rail carries first and second drop cane collars upon the second beam portion that reside opposite the second fin.

15. A fence panel, comprising:
a rectangular perimeter frame, the perimeter frame having four frame rails, each frame rail defining a closed and hollow cross-section having predetermined dimensions between them and including an integral fin, the perimeter frame residing in a plane, each rail defining a depth perpendicular to the plane;
each integral fin residing at neither terminus of the depth and extending generally toward the other integral fins by a width from its respective frame rail;
a barrier component, the barrier component defining a dimensioning mismatch with the predetermined dimensions;
the width being sufficient to allow the barrier component to have been attached to the four integral fins; and
resistance weldments between the barrier component and the four integral fins.

16. The fence panel of claim 15, wherein each integral fin resides at approximately the midpoint of the depth.

17. The fence panel of claim 15, wherein the four frame rails have indicia of roll forming.

18. The fence panel of claim 15, wherein the four frame rails have indicia of extrusion.

19. The fence panel of claim 15, wherein one of the four frame rails carries a connector, the connector residing opposite the fin of the one of the four frame rails.

20. The fence panel of claim 15, wherein one of the four frame rails carries a hinge, the hinge residing opposite the fin of the one of the four frame rails.

21. The fence panel of claim 15, wherein:
a first of the four frame rails carries a hinge, the hinge residing opposite the fin of the first of the four frame rails; and
a second of the four frame rails carries a drop cane collar, the second of the four frame rails being generally parallel to the first of the four frame rails.

22. A method of making a fence panel, comprising the steps of:
creating a hollow first frame rail that includes an integral first fin by one of roll forming and extrusion, the first fin residing in a first plane that includes the cross-sectional center of the first frame rail;
creating a hollow second frame rail that includes an integral second fin by one of roll forming and extrusion, the second fin residing in a second plane that includes the cross-sectional center of the second frame rail;
orienting the first and second frame rails such that the first and second fins extend generally toward each other;
positioning a barrier component upon both the first and second fins, the barrier component having dimensions that are variable from predetermined dimensions due to handling the barrier component during its fabrication; and
joining the barrier component to the first and second fins by resistance welding.

23. The method of claim 22, further including the steps of attaching first and second connectors to the first frame rail.

24. The method of claim 22, further including the steps of:
attaching first and second connectors to the first frame rail opposite the first fin; and
attaching first and second drop cane collars to the second frame rail opposite the second fin.

25. The method of claim 24, further including the steps of:
attaching a latch proximate to the second frame rail; and
positioning a drop cane within the first and second drop cane collars.

* * * * *